(12) United States Patent
Juang et al.

(10) Patent No.: US 8,270,256 B1
(45) Date of Patent: Sep. 18, 2012

(54) MAGNETIC RECORDING DISK DRIVE WITH SHINGLED WRITING AND WIDE-AREA THERMAL ASSISTANCE

(75) Inventors: Jia-Yang Juang, Changhua (TW); Hal J. Rosen, Los Gatos, CA (US); Barry Cushing Stipe, San Jose, CA (US); Timothy Carl Strand, San Jose, CA (US); Petrus Antonius VanDerHeijden, San Jose, CA (US)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 0 days.

(21) Appl. No.: 13/102,959

(22) Filed: May 6, 2011

(51) Int. Cl.
*G11B 11/00* (2006.01)

(52) U.S. Cl. .................................................. 369/13.01

(58) Field of Classification Search .................. None
See application file for complete search history.

(56) References Cited

U.S. PATENT DOCUMENTS

| | | | |
|---|---|---|---|
| 5,986,978 A | 11/1999 | Rottmayer et al. | |
| 6,185,063 B1 | 2/2001 | Cameron | |
| 7,068,453 B2 | 6/2006 | Terris et al. | |
| 7,490,212 B2 | 2/2009 | Kasiraj et al. | |
| 8,059,351 B2 * | 11/2011 | Mutoh | 360/48 |
| 2001/0006436 A1 | 7/2001 | Akiyama et al. | |
| 2003/0021191 A1 * | 1/2003 | Hsu et al. | 369/13.17 |
| 2005/0190479 A1 * | 9/2005 | Terris et al. | 360/59 |
| 2007/0096854 A1 * | 5/2007 | Matsumoto et al. | 335/208 |
| 2007/0188922 A1 | 8/2007 | Tawa et al. | |
| 2010/0033865 A1 | 2/2010 | Hashimoto et al. | |
| 2010/0128382 A1 | 5/2010 | Maeda et al. | |
| 2010/0277827 A1 * | 11/2010 | Wood et al. | 360/75 |
| 2010/0302672 A1 * | 12/2010 | Aoki et al. | 360/59 |
| 2012/0155232 A1 * | 6/2012 | Schreck et al. | 369/13.33 |

* cited by examiner

*Primary Examiner* — Joseph Feild
*Assistant Examiner* — Henok Heyi
(74) *Attorney, Agent, or Firm* — Thomas R. Berthold

(57) ABSTRACT

A thermally-assisted recording (TAR) disk drive uses a "wide-area" heater with "shingled" recording. In shingled recording, the write head pole tip is wider than the read head in the cross-track direction and writes magnetic transitions by making a plurality of consecutive circular paths that partially overlap. The non-overlapped portions of adjacent paths form the data tracks, which are thus narrower than the width of the write pole tip. The data tracks are grouped into annular bands and when data is to be rewritten, all of the data tracks in an annular band are also rewritten. The wide-area heater may be a waveguide with an output end that generates a heated area on the disk recording layer which is wider than the cross-track width of the write pole tip. It has been determined that the use of a wide-area heater with shingled recording does not result in any significant adjacent track erasure (ATE).

14 Claims, 4 Drawing Sheets

MAGNETIC RECORDING DISK DRIVE WITH SHINGLED WRITING AND WIDE-AREA THERMAL ASSISTANCE

TECHNICAL FIELD

This invention relates generally to a thermally-assisted recording (TAR) system, in which data are written while the magnetic recording layer is at an elevated temperature, and more specifically to a TAR disk drive with a "wide-area" heater that heats an area of the disk wider than the data track to be recorded.

BACKGROUND OF THE INVENTION

In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_uV$, where V is the volume of the magnetic grain. Thus a recording layer with a high $K_u$ is important for thermal stability. However, increasing $K_u$ also increases the short-time switching field $H_0$ of the media, which is the field required to reverse the magnetization direction. For most magnetic materials $H_0$ is substantially greater, for example about 1.5 to 2 times greater, than the coercive field or coercivity $H_c$ measured on much longer time-scales. Obviously, the switching field cannot exceed the write field capability of the recording head, which currently is limited to about 12 kOe for perpendicular recording.

Since it is known that the coercivity of the magnetic material of the recording layer is temperature dependent, one proposed solution to the thermal stability problem is thermally-assisted recording (TAR), also called heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive (MR) read head.

Several TAR approaches have been proposed. TAR disk drives with a "small-area" heater direct heat to just the area of the data track where data is to be written by the write head. The most common type of small-area TAR disk drive uses a laser source and an optical waveguide with a near-field transducer (NFT). A "near-field" transducer refers to "near-field optics", wherein the passage of light is through an element with subwavelength features and the light is coupled to a second element, such as a substrate like a magnetic recording medium, located a subwavelength distance from the first element. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. The electromagnetic field of the oscillating tip charge gives rise to optical output in the near field, which is directed onto to the magnetic recording medium to heat just the area exposed to the write field from the write head. Small-area heaters have the advantage that they do not cause adjacent-track erasure (ATE). If data tracks adjacent to the data track being written were to also be heated, the stray magnetic field from the write head may erase data previously recorded in the adjacent tracks. Also, even in the absence of a magnetic field, the heating of adjacent data tracks will accelerate the thermal decay rate over that at ambient temperature and thus data loss may occur. While providing the advantage of less ATE, small-area heaters are difficult to fabricate. Also, because of the relatively inefficient heat transfer the heater temperatures required to reach a desired media temperature are very high.

TAR disk drives with a "wide-area" heater that heat an area much wider than the data track were proposed prior to the proposal for "small-area" heaters. A wide-area heater is relatively easier to fabricate and implement in a conventional recording head structure than a small-area heater. It also has the additional advantage that it heats the data track very efficiently and thus minimizes the required heater temperature for a given required media temperature. However, wide-area heaters have been shown to result in substantial ATE because the adjacent tracks are repeatedly exposed to a combination of both the fringe fields from the write head and the heat from the wide-area heater. TAR systems with wide-area heaters include systems that use a laser coupled to an optical channel, as described in U.S. Pat. No. 5,986,978, and an electrically resistive heater, as described in U.S. Pat. No. 7,068,453 B2.

What is needed is a TAR disk drive that can use a wide-area heater without significant ATE.

SUMMARY OF THE INVENTION

The invention relates to a thermally-assisted recording (TAR) disk drive that uses a "wide-area" heater with "shingled" recording. In shingled recording or writing, the write head pole tip is wider than the read head in the cross-track direction and writes magnetic transitions by making a plurality of consecutive circular paths that partially overlap. The non-overlapped portions of adjacent paths form the data tracks, which are thus narrower than the width of the write pole tip. The data is read back by the narrower read head. The data tracks are grouped into annular bands and when data is to be rewritten, all of the data tracks in an annular band are also rewritten.

The wide-area heater or heat source is preferably a waveguide coupled to a laser and with an output end at the disk-facing surface of the head carrier. The waveguide output end is not coincident with the write pole tip, but is located up-track from the write pole tip. Thus the waveguide output end generates a heated area or spot on the recording layer of the disk which then moves down-track where it can be exposed to the magnetic write field from the write pole tip. The waveguide output end heats an area wider than the cross-track width of the write pole tip, preferably an area that covers multiple tracks on both sides of the track aligned with the write pole tip. With such a wide-area heater, each time an entire annular band is written, the data in each data track will be exposed to the heat for successive passes after it has been written. However, it has been determined from modeling that in the present invention the use of a wide-area heater does not result in any significant adjacent track erasure (ATE). As a result of the large heated spot there are a significant number of tracks that experience only large temperature increases but no significant magnetic fields.

For a fuller understanding of the nature and advantages of the present invention, reference should be made to the following detailed description taken together with the accompanying figures.

DETAILED DESCRIPTION OF THE INVENTION

Figure 1:
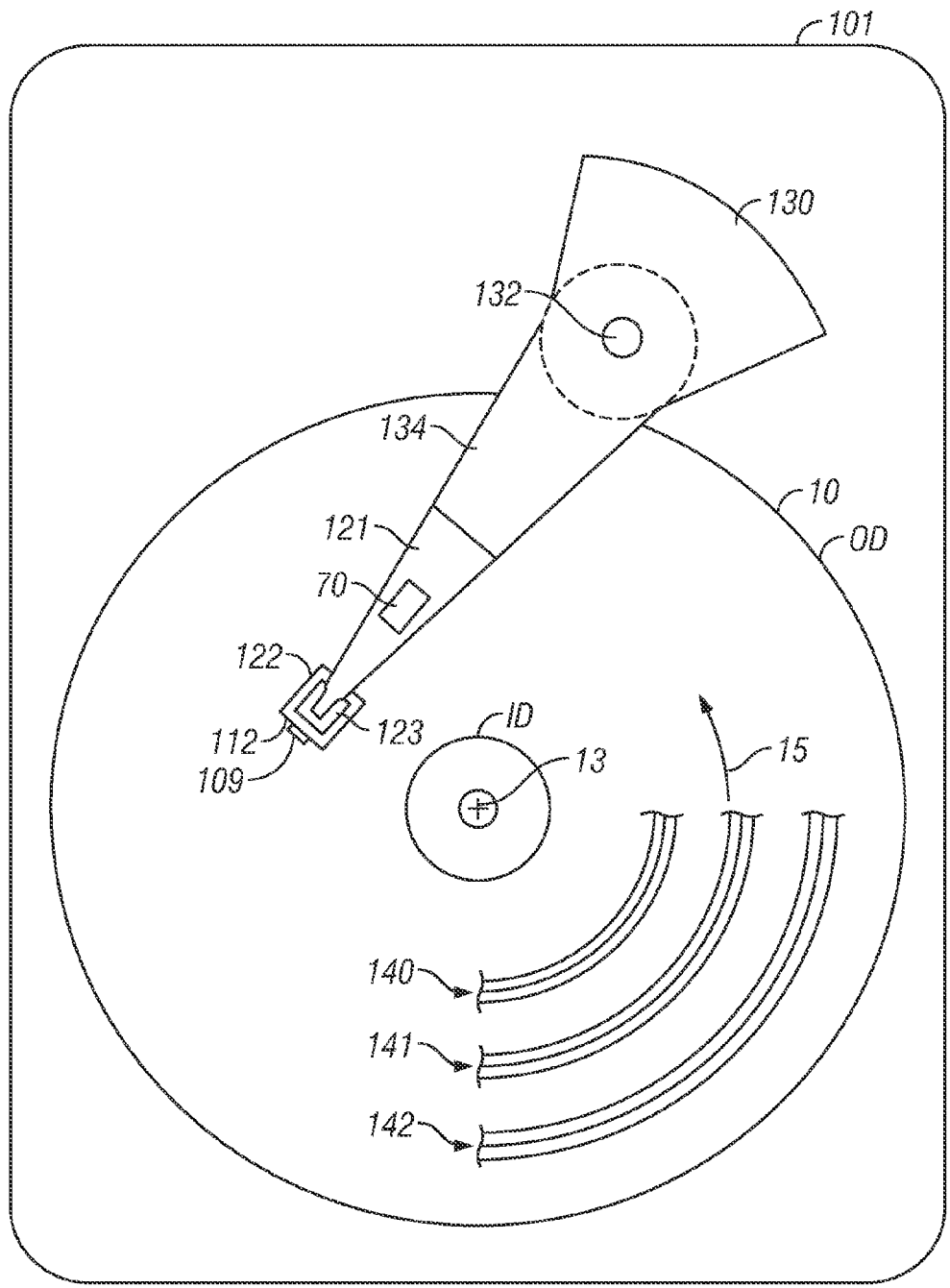
FIG. 1 is a top view of a thermally-assisted recording (TAR) disk drive according to the invention.

FIG. 1 is a top view of a thermally-assisted recording (TAR) disk drive according to the invention. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). A laser 70 is supported on suspension 121, but alternatively could be supported on arm 134 or slider 122. The slider 122 supports an optical channel or waveguide (not shown in FIG. 1) for directing radiation from laser 70 to the disk 10. Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled recording, also called shingled writing. Thus FIG. 1 also illustrates portions of the circular shingled recording data tracks grouped as annular bands on the recording layer of disk 10. Only portions of three bands 140, 141, 142 are depicted, but there would typically be a large number of bands. For example, for a 2.5 inch disk drive with shingled recording, the track pitch may be about 50 nm with each band containing several hundred tracks and with a separation between the bands of about 100 nm. In shingled recording the write head, which is wider than the read head in the cross-track direction, writes magnetic transitions by making a plurality of consecutive circular paths that partially overlap. The non-overlapped portions of adjacent paths form the data tracks, which are thus narrower than the width of the write head. The data is read back by the narrower read head. When data is to be rewritten, all of the data tracks in an annular band are also rewritten. Shingled writing is well-known in the art, for example as described in U.S. Pat. No. 6,185,063 B1.

Figure 2:
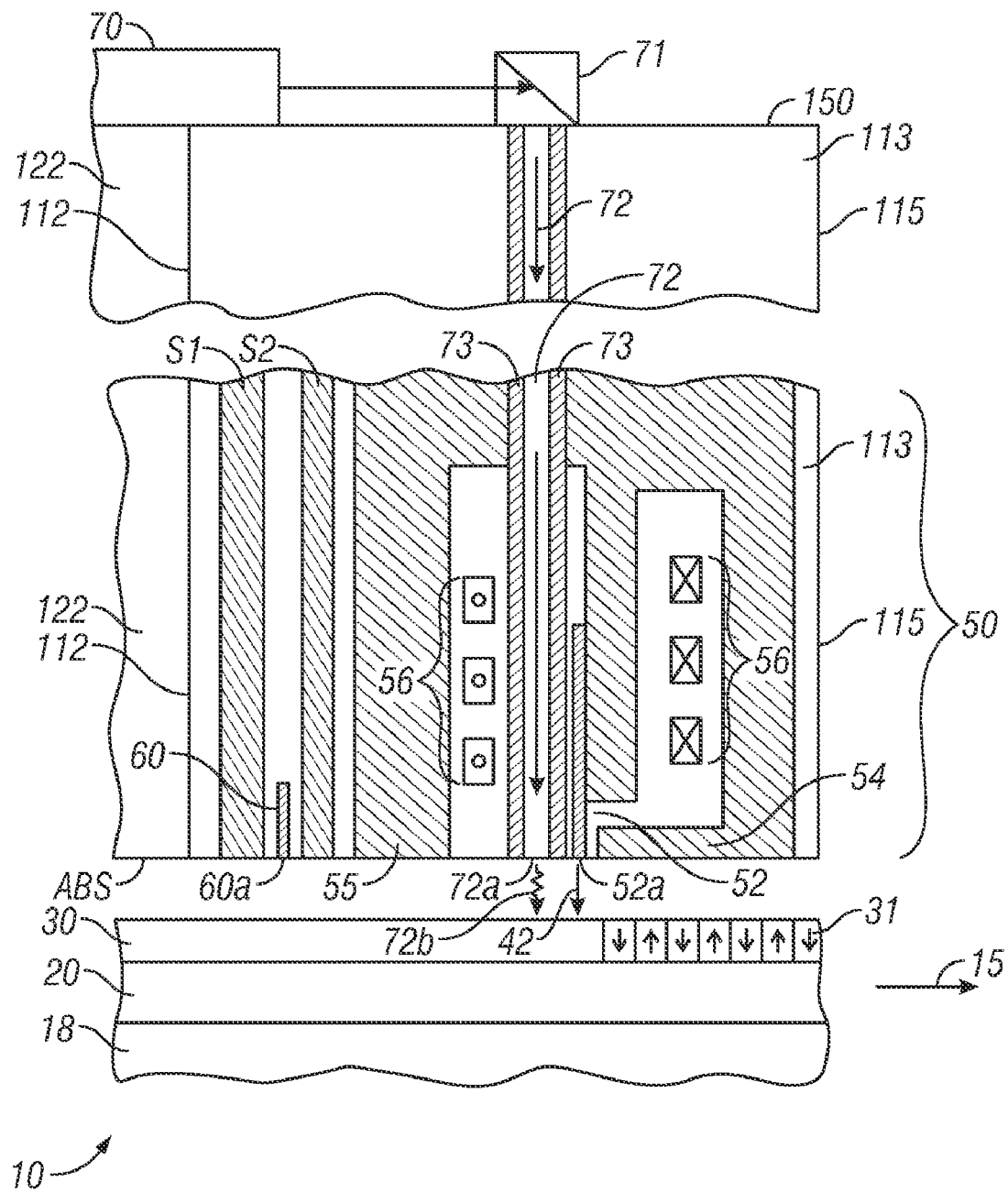
FIG. 2 is a sectional view through a portion of the TAR head and associated perpendicular magnetic recording disk according to the invention.

FIG. 2 is a sectional view through a portion of the TAR disk 10 and air-bearing slider 122 that functions as the head carrier with integrated TAR head formed on slider end 112. FIG. 2 is not drawn to scale because of the difficulty in showing the very small features. The TAR disk 10 is depicted as a perpendicular magnetic recording disk with a disk substrate 18, a continuous magnetic recording layer 30 with perpendicular magnetic anisotropy and an underlayer 20 that may function as a heat sink layer. The underlayer 20 may alternatively be a soft magnetic underlayer (SUL) that acts to carry the flux from the magnetic write field and would typically be located below an exchange break layer (EBL) (not shown) that beaks the magnetic exchange between the SUL and recording layer 30. The SUL may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The recording layer 30 is depicted with magnetized regions 31 that have been perpendicularly magnetized, meaning that they are stored in the recording layer 30 in a generally perpendicular or out-of-plane orientation, as shown by the arrows in regions 31. The recording layer 30 may be any high anisotropy (high $K_u$) perpendicular media, such as a cobalt-chromium-platinum (CoCrPt) alloy with a granular layer grown on a special growth-enhancing sublayer, or a multi-layer of alternating films of Co with films of platinum (Pt) or palladium (Pd). The recording layer 30 may also be an $L1_0$ ordered alloy such as FePt, FeNiPt, $Co_3Pt$ or CoSm. The disk 10 would also typically include a protective overcoat (not shown) over the recording layer 30.

Also shown on slider 122 with disk-facing surface or air-bearing surface (ABS) is the read/write head 109 (FIG. 1) with read head 60 and write head 50. Write head 50 includes a yoke that connects write pole 52 to a first return pole 54 and a second pole 55. The ABS of slider 122 is the surface that faces the disk 10 and is shown without the thin protective overcoat typically present in an actual slider. The ABS shall mean the surface of the head carrier that is covered with a thin protective overcoat, the actual outer surface of the head carrier if there is no overcoat, or the outer surface of the overcoat. Write current passes through a coil 56 of the write head 50 to generate a magnetic field (arrow 42) at the tip 52a of write pole 52. This magnetic field magnetizes the recording layer 30 beneath the write pole tip 52a as the disk 10 moves past the write head 50 in the direction of arrow 15. The detection or reading of the recorded regions 31 is by a read head 60 having a sensing edge 60a at the ABS that detects the transitions between the magnetic regions 31. The read head 60 is typically a magnetoresistive (MR) read head, such as a tunneling MR (TMR) read head in which a sense current passes perpendicularly through the layers making up the head. A pair of magnetically permeable shields S1 and S2 are located on opposite sides of read head 60 to prevent magnetic flux from magnetized regions 31 other than the region being read from reaching the read head sensing edge 60a. The write coil 56 is shown as a conventional helical coil wrapped around the portion of the yoke that directly supports the write pole 52, with the electrical current directions being shown as into the paper by the coil cross-sections marked with an "X" and out of the paper by the coil cross-sections marked with a solid circle. However, the coil may also be a conventional flat or "pancake" coil wrapped around the yoke.

The slider 122 with integrated TAR head has an outer surface or trailing end 115 with electrically conductive pads (not shown) that connect through the insulating layers 113 to the read head 60 and coil 56 of write head 50.

The slider 122 also supports a laser 70, mirror 71, and an optical channel or waveguide 72 which has its output end 72a at the ABS. The laser 70 and mirror 71 are shown as being supported on the top surface 150 of slider 122. The optical waveguide 72 is depicted in FIG. 2 as extending through the yoke of write head 50 and being located between the write pole 52 and return pole 55. However the optical waveguide 72 may be located at other locations, such as between shield S2 and return pole 55. The waveguide 72 is formed of a core material such as $Ta_2O_5$ or another high index dielectric material that is transmissive to radiation at the wavelength of the laser and is surrounded by a dielectric cladding layer 73 (for example $SiO_2$ or $Al_2O_3$) of lower refractive index than the core material. While the slider 122 in FIG. 2 is depicted as supporting mirror 71 for directing the laser radiation from laser 70 into waveguide 72, it is known to use a grating coupler coupled to the waveguide, as described for example in US 20090310459 A1. The unshaded portions of the TAR head formed on slider end 112 in FIG. 2, with the exception of optical waveguide 72, represent insulating material, typically alumina. The laser 70 may be a CD-RW type laser diode with a wavelength of approximately 780 nm. The laser 70 may also be a vertical-cavity surface-emitting laser (VCSEL), or an external-cavity VCSEL that generates laser radiation with a wavelength between about 920 nm and 1000 nm.

The optical waveguide 72 directs radiation (represented by wavy arrow 72b) from its output end 72a to the recording layer 30 to heat the recording layer to lower the coercivity sufficient to ensure good writeabilty. In some implementations of TAR the recording layer may be heated to nearly or above the Curie temperature of the material making up the recording layer 30. During writing, the recording layer 30 moves relative to the slider 122 in the direction shown by arrow 15 so that the heated portion of the recording layer can be exposed to the write field 42 from the write pole tip 52a. The heating from radiation through optical waveguide 72 temporarily lowers the coercivity $H_c$ of the recording layer 30 so that the magnetic regions may be oriented by the write field 42 from write pole tip 52a. The magnetic regions become oriented by the write field 42 if the write field $H_w$ is greater than $H_c$. After a region of the recording layer 30 has been exposed to the write field from the write pole tip 52a and heat from the optical waveguide 72 it becomes written or recorded as a magnetized region 31 when it cools. The transitions between recorded regions 31 represent written data "bits" that can be read by the read head 60 with its sensing edge 60a at the ABS.

Figure 3:
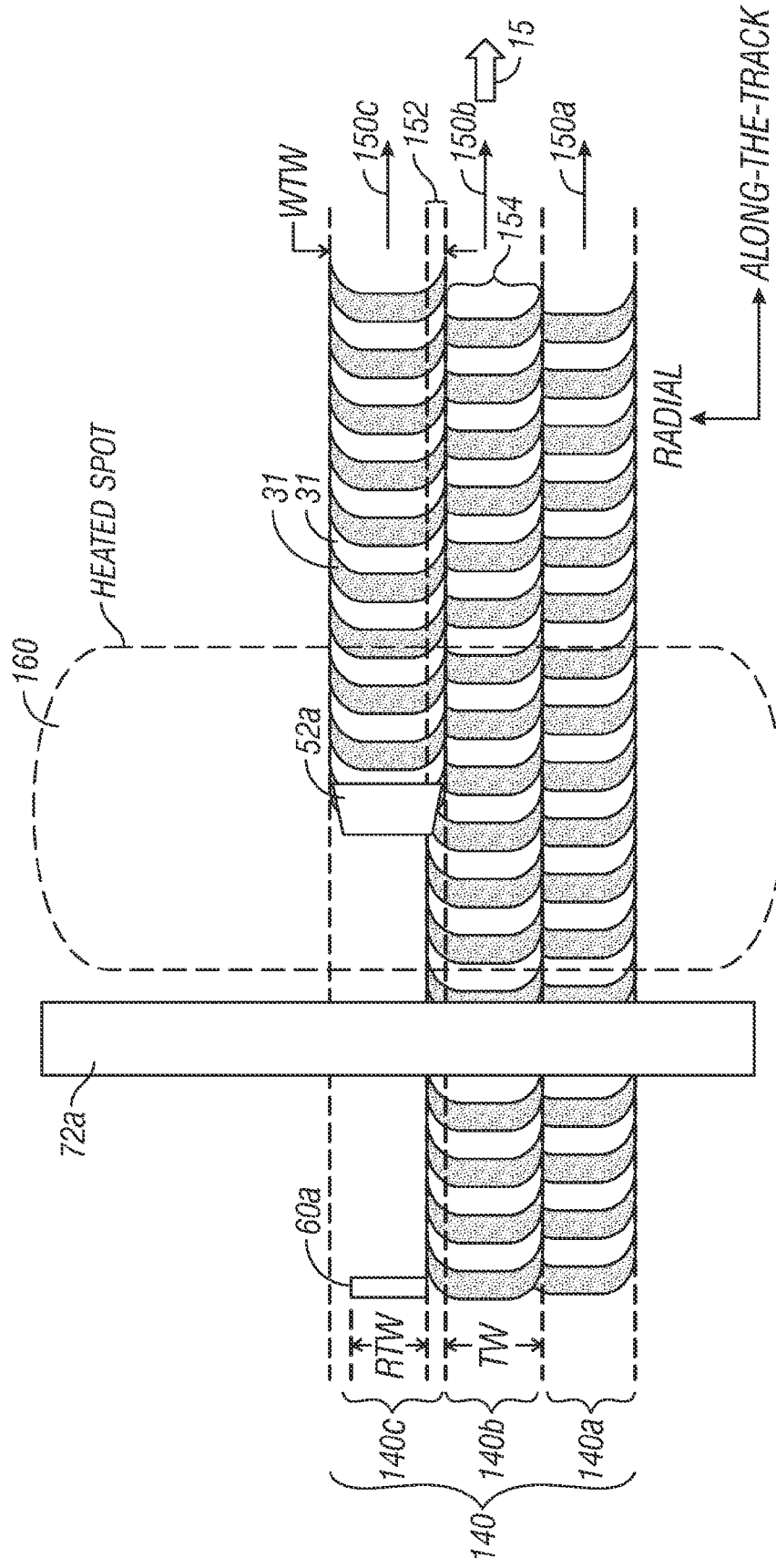
FIG. 3 is a view from below the recording layer of the disk toward the air-bearing surface (ABS) of the TAR head carrier and illustrates the method of shingled writing with thermal assistance from a wide-area heater according to the invention.

FIG. 3 is a view from below the recording layer of the disk toward the ABS and is intended to be a graphical representation of the method of recording magnetized regions on the disk using shingled writing with thermal assistance according to the invention. Two concentric tracks 140a and 140b of an annular band 140 (FIG. 1) are shown, along with a path of magnetic transitions aligned with the write pole tip 52a that will result in a third data track. The write pole tip 52a has a cross-track width (WTW) that is wider than the read head sensing edge 60a cross-track width (RTW). When writing data, the write pole tip 52a generates paths of magnetic transitions (shown as the transitions between white and shaded magnetized regions 31) as the recording layer moves in the direction of arrow 15. In shingled writing all of the data tracks in an annular band are written whenever any portion of the data in an annular band is to be rewritten. To write the magnetic transitions that result in the three data tracks the write head first writes a path centered along line 150a, after which the actuator moves the write head radially by an incremental distance to write a path of magnetic transitions centered along line 150b, after which the actuator moves the write head radially by an incremental distance to write a path of magnetic transitions along line 150c. Path 150b overlaps a portion of path 150a and path 150c overlaps a portion of path 150b. For example, path 150b has an overlapped portion 152 and a non-overlapped portion 154. After all the tracks in an annular band have been written in the shingled writing method, the data tracks are the non-overlapped portions, as shown by data tracks 140a, 140b. The written data tracks thus have a radial track width (TW) that is typically slightly greater than RTW of the read head sensing edge 60a. For example, RTW is typically 0.6 to 0.7 times TW.

As shown in FIGS. 2 and 3, the waveguide 72 (with output end 72a at the ABS) is not coincident with the write pole tip 52a, but is located up-track from the write pole tip 52a, preferably by a distance equal to or greater than 50 nm. Thus the waveguide output end 72a is a heat source that generates a heated area or spot 160 on the recording layer which then moves down-track where it can be exposed to the magnetic write field from the write pole tip 52a. As shown in FIG. 3, the waveguide output end 72a is a "wide-area" heater because it heats an area wider than WTW, preferably an area that covers multiple tracks on both sides of the track aligned with the write pole tip 52a. The heated spot 160 may cover a relatively large number of tracks, for example if the TW is about 50 nm, the heated spot 160 may be about 1 micron, and thus cover about 20 tracks (10 tracks on each side of the write head). However, it is only when a portion of the recording layer in the heated spot 60 is exposed to the write field from the trailing edge of the write pole tip 52a that a magnetic transition is written. Thus the locations of the down-track transitions 31 in the circular path 150c are determined by the write field gradient of the write pole tip 52a and not the thermal gradient between the heated spot 160 and an unheated region of the recording layer. With such a wide-area heater, each time an entire annular band is written, the data in each data track will be exposed to the heat for successive passes after it has been written, for example at least 10 passes in this example. However, it has been determined from modeling that in the present invention the use of a wide-area heater does not result in any significant ATE. As a result of the large heated spot there are a significant number of tracks that experience only large temperature increases but no significant magnetic fields.

In the preferred embodiment the recording layer 30 is a granular layer formed of a high-$K_u$ alloy comprising at least Co, Pt and Cr. Depending on the specific composition, a high-$K_u$ granular CoPtCr alloy may have a switching field $H_0$ at ambient temperature of greater than about 8 kOe and up to about 20 kOe. The heat source must reduce the coercivity $H_c$ enough so that $H_0$ is reduced to a value significantly below the write field. Depending on the specific composition of the CoPtCr alloy and the specific write head, the heat source should reduce the coercivity $H_c$ by at least 500 Oe, meaning that $H_0$ would be reduced by about at least 800 Oe. For example, a CoPtCr alloy may have a $K_u$ of approximately $7 \times 10^6$ ergs/cm$^3$ and a coercivity $H_c$ at ambient temperature of about 9 kOe, meaning that the switching field $H_0$ may be above 12 kOe. The heat source would raise the temperature in the heated spot 160 of the recording layer 30 to approximately 250° C. so that when exposed to the write field from the write pole tip 52a, the coercivity $H_c$ would be reduced by approximately 4 kOe (a switching field $H_0$ reduction of about at least 5 kOe). This temperature is substantially below the Curie temperature of the CoPtCr alloy, which would be approximately 600° C.

Figure 4:
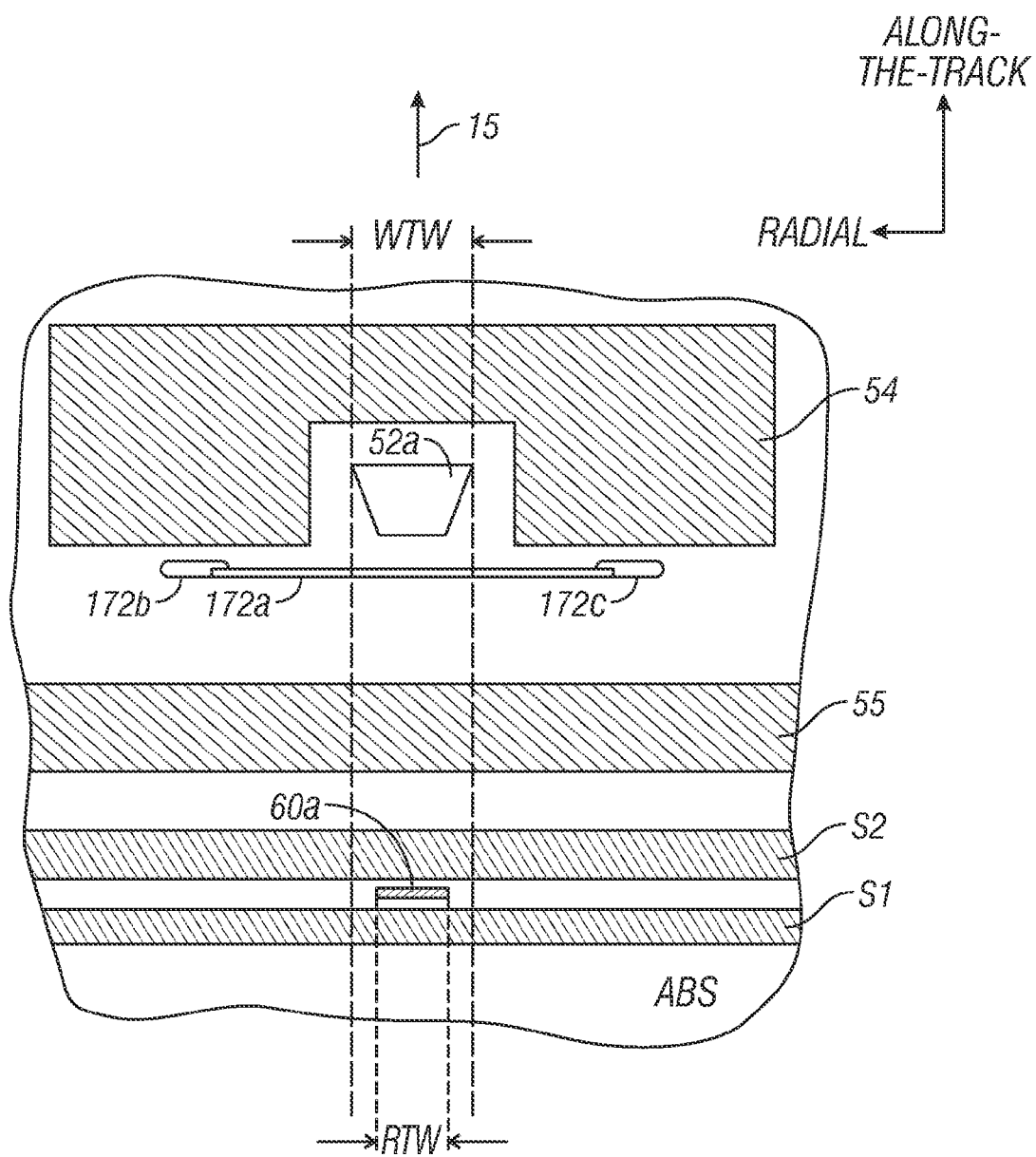
FIG. 4 is a view of the ABS of an embodiment of the invention with a TAR head having an electrically resistive heater as the wide-area heat source.

The embodiment of the invention in FIGS. 1-3 uses an optical waveguide with an output end at the ABS as the wide-area heat source. However, other heat sources are possible. FIG. 4 depicts the ABS view of a TAR head with a wide-area electrically resistive heater as the heat source, as described in U.S. Pat. No. 7,068,453 B2. The write head pole tip 52a has a cross track width (WTW) wider than the cross-track width of the read head sensing edge 60a, so that the write head can perform shingled writing as the actuator moves it radially in increments less than WTW. An electrically conductive heating element has an edge 172a at the ABS that extends wider than WTW so as to cover multiple tracks. The heating element may be formed of a relatively high electrical resistivity material, such as chromium (Cr), nichrome (NiCr) or titanium (Ti), and have electrical contacts 172b, 172c for connection to a power supply.

The thermal decay due to purely temperature effects, without the magnetic field effect, can be referred to as thermal track erasure (TTE), while the thermal decay due to the magnetic field effect in combination with the temperature effect can be referred to as ATE. ATE for a single pass was compared with ATE for a single pass plus TTE for 10 passes. For this calculation a one 1 micron diameter heated spot and a 50 nm track width were assumed. The results of these calculations on the magnetization M are shown in Table 1 for two values of magnetic field strength $H/H_w$ where $H_w$ is the on-track write field from the head and H is the field generated at the center of the adjacent track. As shown in Table 1 the additional effect on the magnetization of 10 TTE passes over the ATE effect from a single pass is relatively small, i.e. for $H/H_w=0.2$ it reduces it only an additional 2% (from 97% to 95%). For $H/H_w=0.4$ the additional effect is even smaller, i.e., it reduces the magnetization from 92% to 91.8%. Because the shingled writing results in only a single exposure of the recorded data in adjacent tracks to the magnetic field, the thermal decay due to the combination of magnetic field and heating is significantly reduced. And as shown by Table 1, the effect of heating alone, even for a relatively large number of passes has little effect on thermal decay. It is believed that essentially all the small grains with low $K_uV$ have been removed from the distribution by the exposure to the write field during the single pass of the write head.

TABLE 1

| $H/H_w$ | M (1 pass ATE) | M (1 pass ATE) (10 passes TTE) |
|---|---|---|
| 0.2 | 0.970 | 0.950 |
| 0.4 | 0.920 | 0.918 |

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted shingled-writing magnetic recording disk drive comprising:
    a rotatable magnetic recording disk comprising a substrate and a magnetic recording layer on the substrate;
    a head carrier having a recording-layer-facing surface;
    a heat source on the head carrier for heating an area of the recording layer as the disk rotates;
    a write head on the head carrier, the write head generating a generally circular path of magnetic transitions in the heated recording layer as the disk rotates; and
    an actuator connected to the head carrier for moving the head carrier generally radially across the disk, the actuator being capable of moving the head in an increment less than the radial width of a path, whereby the write head may generate partially overlapping generally circular paths of magnetic transitions; and
    wherein the heated area of the recording layer is wider than the radial width of the write head.

2. The disk drive of claim 1 wherein the overlapping circular paths are grouped into annular bands on the recording layer.

3. The disk drive of claim 1 further comprising a magnetoresistive read head on the head carrier for reading magnetic transitions in non-overlapping portions of the circular paths.

4. The disk drive of claim 1 further comprising a laser, and wherein the heat source comprises an optical waveguide coupled to the laser and having an output face at the recording-layer-facing surface for directing laser radiation to the recording layer.

5. The disk drive according to claim 1 wherein the location of the magnetic transitions in the circular path are determined by the write field gradient of the write head.

6. The disk drive of claim 1 wherein the magnetic recording layer is a perpendicular magnetic recording layer and wherein the disk includes a soft magnetic underlayer below perpendicular magnetic recording layer.

7. The disk drive of claim 6 wherein the waveguide output face is located on the recording-layer-facing surface of the head carrier a distance equal to or greater than 50 nm from the write head in the along-the-path direction.

8. The disk drive of claim 1 wherein the heat source comprises an electrically-resistive heater.

9. The disk drive of claim 1 wherein the heat source heats the recording layer to a temperature less than the Curie temperature of the recording layer.

10. A thermally-assisted shingled-writing magnetic recording disk drive comprising:
    a rotatable magnetic recording disk comprising a substrate and a perpendicular magnetic recording layer on the substrate;
    a slider having an air-bearing surface (ABS) facing the recording layer;
    a laser;
    an optical waveguide on the slider and coupled to the laser, the waveguide having a laser radiation output end at the ABS for heating an area of the recording layer as the disk rotates;
    a write head on the slider and having a write pole tip at the ABS with a radial width, the pole tip generating in the heated recording layer a circular path of magnetic transitions having a radial width generally equal to the radial width of the pole tip;
    an actuator connected to the slider for moving the slider generally radially across the disk, the actuator being capable of moving the pole tip in an increment less than the radial width of the pole tip, whereby the pole tip may generate partially overlapping generally circular paths of magnetic transitions; wherein the heated area of the recording layer is wider than the radial width of the pole tip; and a read head having a sensing edge at the ABS with a radial width less than the radial width of the pole tip for reading non-overlapping portions of the circular paths.

11. The disk drive of claim 10 wherein the overlapping circular paths are grouped into annular bands on the recording layer.

12. The disk drive of claim 10 wherein the output end of the waveguide has a radial width greater than three times the radial width of the pole tip.

13. The disk drive of claim 10 wherein the perpendicular magnetic recording layer comprises a granular layer of an alloy comprising Co, Pt and Cr and the waveguide output end is capable of heating the granular CoPtCr alloy layer to a temperature sufficient to lower the coercivity $H_c$ by at least 500 Oe.

14. The disk drive of claim 10 wherein the perpendicular magnetic recording layer is selected from an ordered alloy selected from FePt, FeNiPt, $Co_3Pt$ and CoSm, and a multilayer of alternating films selected from a Co/Pt multilayer and a Co/Pd multilayer.

* * * * *